United States Patent
Carnahan

(10) Patent No.: US 8,001,113 B2
(45) Date of Patent: Aug. 16, 2011

(54) QUERY STRING MATCHING METHOD AND APPARATUS

(75) Inventor: John M. Carnahan, Redondo Beach, CA (US)

(73) Assignee: Yahoo! Inc., Suunyvale, CA (US)

( * ) Notice: Subject to any disclaimer, the term of this patent is extended or adjusted under 35 U.S.C. 154(b) by 0 days.

(21) Appl. No.: 12/765,570

(22) Filed: Apr. 22, 2010

(65) Prior Publication Data

US 2010/0205173 A1 Aug. 12, 2010

Related U.S. Application Data

(63) Continuation of application No. 10/353,785, filed on Jan. 28, 2003, now Pat. No. 7,734,565, which is a continuation-in-part of application No. 10/346,721, filed on Jan. 18, 2003, now abandoned.

(51) Int. Cl.
*G06F 7/00* (2006.01)
*G06F 17/30* (2006.01)

(52) U.S. Cl. ........ 707/719; 707/705; 707/720; 707/721; 707/722

(58) Field of Classification Search .......... 707/705, 707/719–722, 767, 769, 772; 715/863; 709/202, 709/219
See application file for complete search history.

(56) References Cited

U.S. PATENT DOCUMENTS

| | | | |
|---|---|---|---|
| 5,761,538 A * | 6/1998 | Hull | 712/300 |
| 6,671,681 B1 * | 12/2003 | Emens et al. | 707/706 |
| 6,963,863 B1 * | 11/2005 | Bannon | 1/1 |
| 2002/0099671 A1 * | 7/2002 | Mastin Crosbie et al. | 705/500 |

OTHER PUBLICATIONS

Arcot Rajasekar; "String-Oriented Databases"; IEEE; Sep. 22-24, 1999; pp. 1-10.*
Abstract for: Rajasekar, A.; "String-Oriented databases"; IEE; Sep. 22-24, 1999; p. 1.*
Kjell Lemstrom and Lauri Hella: "Approximate Pattern Matching is Expressible in Transitive Closure Logic"; IEE; Jun. 26-28, 2000; pp. 1-11.*
Abstract for: Lemstrom, S. and Hella, L.; "Approximate pattern matching is expressible in transitive closure logic"; IEE; Jun. 26-28, 2000; p. 1.*
Merrill E. Isenman and Dennis E. Shasha; "Performance and Architectural Issues for String Matching"; IEEE; Feb. 1990, vol. 39, No. 2; pp. 238-250.*

\* cited by examiner

*Primary Examiner* — Ella Colbert
(74) *Attorney, Agent, or Firm* — Seth H. Ostrow; Ostrow Kaufman LLP

(57) ABSTRACT

In one implementation, a method is provided for increasing relevance of database search results. The method includes receiving a subject query string and determining a trained edit distance between the subject query string and a candidate string using trained cost factors derived from a training set of labeled query transformations. A trained cost factor includes a conditional probability for mutations in labeled non-relevant query transformations and a conditional probability for mutations in labeled relevant query transformations. The candidate string is evaluated the for selection based on the trained edit distance. In some implementations, the cost factors may take into account the context of a mutation. As such, in some implementations multi-dimensional matrices are utilized which include the trained cost factors.

20 Claims, 3 Drawing Sheets

QUERY STRING MATCHING METHOD AND APPARATUS

CLAIM OF PRIORITY

This application is a continuation application of and claims priority to U.S. Ser. No. 10/353,785, filed on Jan. 28, 2003, now U.S. Pat. No. 7,734,565 entitled "Query String Matching Method and Apparatus", which is a continuation-in-part application of U.S. Ser. No. 10/346,721, now abandoned, filed on Jan. 18, 2003 entitled "Query String Matching Method and Apparatus" which are incorporated herein in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

In database or file accessing, computer based recognition of query strings often relies on mapping or matching of an input query string with a term from a set of stored terms. Indefinite query strings, such as for example those containing misspelled terms, are mapped only if the misspelled term is also stored. The misspelled term can be replaced with the correct spelling before mapping, or the misspelled term can be included in the term set to allow its mapping. Out of practicality, however, only the most common misspellings of selected terms can be stored and recognized for matching. Thus, uncommon misspellings of terms can go unrecognized even if they are only slight errors, and improved query string matching can increase the relevance of database and file accessing and/or searching.

SUMMARY

In one implementation, a method is provided for increasing relevance of database search results. The method includes receiving a subject query string and determining a trained edit distance between the subject query string and a candidate string using trained cost factors derived from a training set of labeled query transformations. A trained cost factor includes a conditional probability for mutations in labeled non-relevant query transformations and a conditional probability for mutations in labeled relevant query transformations. The candidate string is evaluated for the selection based on the trained edit distance.

In some implementations, the cost factors may take into account the context of a mutation. As such, in some implementations multi-dimensional matrices are utilized which include the trained cost factors.

DESCRIPTION

Figure 1:
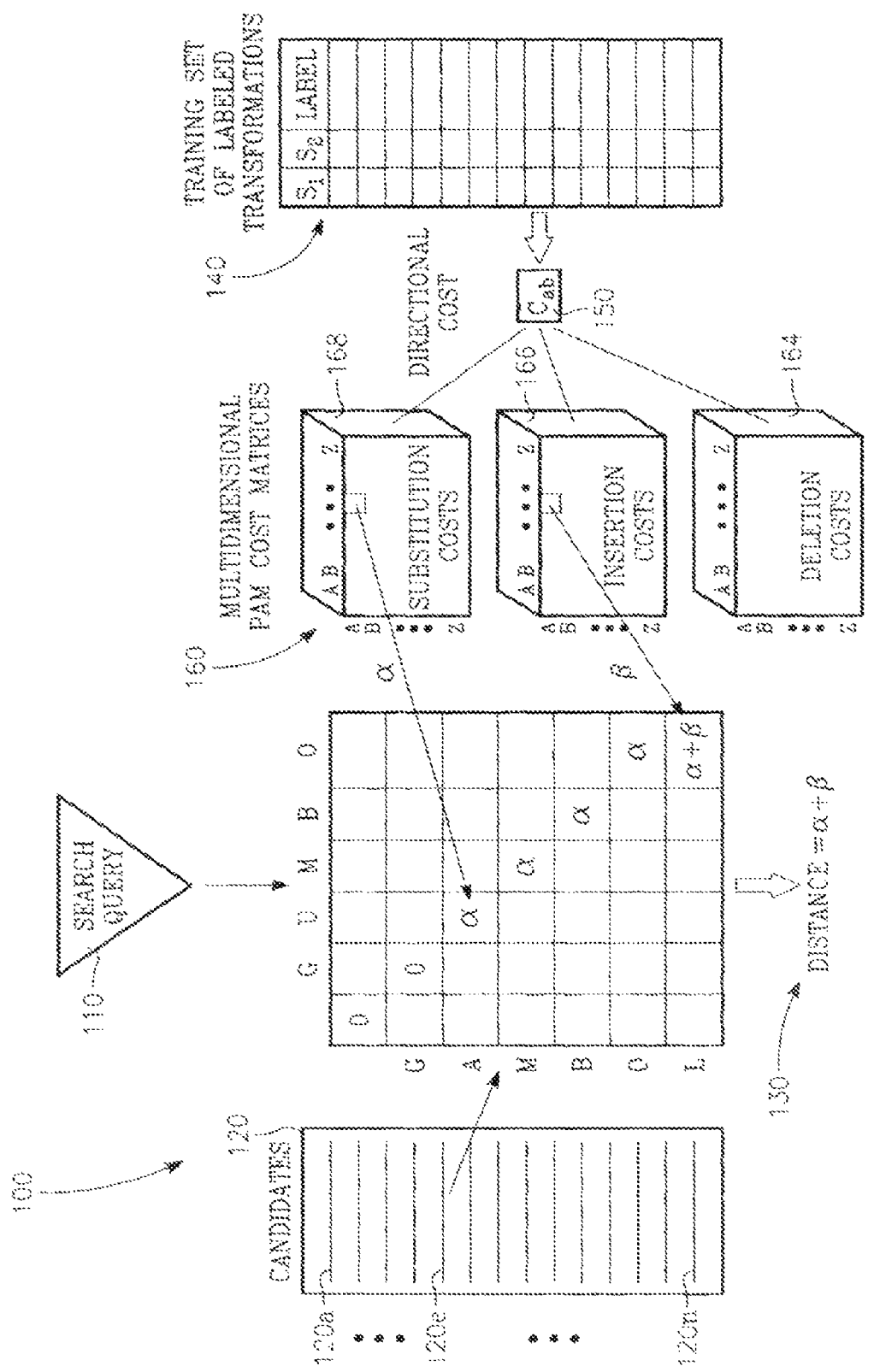
FIG. 1 shows simplified block diagram of a possible implementation in accordance with the present invention.

In database accessing, such as with Internet search engine technology, the widely-used notion of search coverage can be described as the proportion of queries that produce results. In many cases unmatched queries, those that do not have results, are similar by some degree to one or more known queries with result sets. One way to increase coverage is to substitute a very similar matching query for an unmatched query. In most cases similarity measures are based on the alignment between the two query strings.

The edit distance between two strings measures similarity as the amount of effort required to transform one string into the other. This is also known as the Levenshtein distance. The quality of a candidate or transformed query can be estimated by minimizing the edit distance from the input query and maximizing the likelihood that the new query will produce relevant results to the original.

A query transducer can transform any string into another by successive application of a number of operations, which can be for example, the substitution of any character for another and the insertion or deletion of any arbitrary character. These operations result in transitions that can be dependent on the character itself and its context within the query. Thus we can assign a cost to charge for each of these operations and calculate the total cost, $cost(\sigma)$, for the series $\sigma$ of these operations needed to perform the complete transformation. Then the distance between any two strings s and t is $$dist(s,t) = \min_{S(s,t)} cost(\sigma)$$

where $S(s, t)$ is the set of all series of operations transforming s into t.

In a conventional Levenshtein transducer the cost for any operation is independent of the actual character and the location of the transition. Typically, simple scoring schemes, such as 0 for a match and +1 for a mismatch, are not enough to account for the properties that influence slight misspellings of a query. For instance it is more likely that changing a word to its plural form by adding an 's' to the end of word will be relevant than deleting the first character of a word. Unfortunately the factors that influence the quality of a given transition within a query are so numerous and varied that defining all of the heuristics is unlikely. As discussed further below, a truer estimate of the edit distance between strings may be determined using trained cost factors based on the conditional probabilities of non-relevant and relevant transformations derived from a training set of labeled transformations. Moreover, the cost factors derived from the training set may take into account the context of mutations. Thus, the trained cost factors may be provided as multi-dimensional matrices in some implementations as set forth below.

Mutations of a query string are defined as all possible discrete transitions that can occur on a sequence of characters. In this way we can further define a subset of these mutations, point mutations, as the admissible operations of the distance calculation. The rates of point mutations can be estimated based on scoring matrices called PAM matrices. PAM is an acronym for Point Accepted Mutations. Using this notation a 1-PAM matrix reflects the costs for producing one mutation per whole-query transformation and a 2-PAM matrix would affect the costs for two mutations and so on. These matrices are functions of the distance measure used so that from the 1-PAM matrix any number of n-PAM matrices can be derived. In order to build a 1-PAM matrix M we need the following:
 a list of accepted mutations, and
 the probabilities of occurrence $p_a$ for each character $\alpha$.

An accepted mutation in our context is a mutation that can occur between any unmatched query string and its transformed version without regard to relevance. This allows mutations that are both positively and negatively selected. To collect this list we can consider mutations as either directed or undirected events. For the basic 1-PAM matrix we consider only immediate mutations, $\alpha \to b$, and not $\alpha \to c \to b$. The mutations can be counted by first determining the minimum mutations required to transform one string into another using a uniform scoring scheme. Then the probabilities of occurrence can be estimated by computing the relative frequency of a character such that $$\sum_a p_a = 1$$

From the list of mutations we can compute $f_{ab}$ which is the number of times $\alpha \to b$ or $\alpha \leftrightarrow b$ if we are considering undirected events where $f_{ab} = f_{ba}$. We also need to compute the sum for a mutations:

$$f_a = \sum_{a \neq b} f_{ab} \text{ and } f = \sum_a f_a$$

where $f_a$ is the absolute frequency of mutations involving $\alpha$ and $f$ is total number of character occurrences in mutations. If events are directed then $f_a$ is the number of times another character is substituted for $\alpha$ or $\alpha$ is inserted or deleted, and $f$ is the number of mutations. Thus, the relative mutability of $\alpha$ is defined as $$m_a = \frac{f_a}{100 f p_a}$$

This estimated mutability is a measure of how much the character changed throughout the population. From this we can estimate the conditional probability of $\alpha$ changing to b as the ratio between $\alpha \to b$ mutations and the number of mutations involving $\alpha$:

$$M_{ab} = \frac{f_{ab} m_a}{f_a}$$

Based on this we can create a matrix of the conditional probabilities for all known M mutations.

A PAM matrix may be constructed that accounts for mutations in both relevant and not-relevant query transformations. To include these as costs within our distance calculation we consider the following:
 Mutations that have no effect on relevance have a 0 cost. This means that any cost of 0 will remove the effect of that mutation on the distance.
 Mutations that have relative mutability of 0, that is their mutability is unknown, have a relative cost of 1. This means that the "penalty" for not knowing whether a mutation will have a positive or negative effect on relevance is 1.
 Mutations with a positive effect on relevance will have relative cost between 0 and 1.
 Mutations with a negative effect on relevance will have a relative cost greater than 1.

Defined this way we can further define the relative cost of $\alpha \to b$, $C_{ab}$:

$$C_{ab} = 1 - RM_{ab} + NRM_{ab} \qquad \text{Equation (1.1)}$$

where $RM_{ab}$ and $NRM_{ab}$ are the conditional probabilities for mutations on labeled relevant and not-relevant query transformations respectively. These values should first be normalized such that $RM_{ab} + NRM_{ab} = 1$. This is called the cost by character. By this definition, mutations that occur equally often in both relevant and not-relevant transformations will have a cost of 1 and be considered as having an unknown effect on relevance.

Given a sample of known relevant and not-relevant query transformations we can create a matrix of directional costs $C_{ab}$ associated with each character transition for each of n-mutation classes. The sample may be a block of transformed strings having some good or relevant transformations, and some bad or irrelevant transformations. We can characterize each transformation by what characters changed and whether the changes were beneficial or not beneficial. For example, the training set may be a sample of raw indefinite search queries, which are transformed within a uniform edit distance, and manually reviewed to determine the relevance of each transformation. From this, the relevance/irrelevance of each character transformation is evaluated and utilized in determining the transformation cost factors as discussed above.

These mutation cost matrices can then be used to calculate the trained Levenshtein edit distance for any pair of strings. Because the costs for substitution, insertion, and deletion of a given character are likely different, the relative mutabilities and cost matrices may be considered as independent for each mutation type. Further, it is possible to determine the cost by character by aggregation.

This above described estimate of distance does not, however, take into account the context of the mutation, or where the mutation occurs within the string. It may be the case that mutations depend on the position of the mutation and characters or other mutations that are close in proximity. One way to account for the position of a mutation within a query is to use a function that relates position and relative cost. This is the cost by position. If the cost by position and cost by character are independent then their effect on the total cost should be additive.

In this case the cost of both relative position and character transition can be expressed by:

$$CP_{ab} = C_{ab} f(x) \qquad \text{Equation (1.2)}$$

where f is a function that describes the relative cost of a mutation at position x within a query string.

In implementation, the cost of position may be determined differently for each type of mutation, i.e. substitution, insertion, deletion, etc. First, the probability of each mutation type for a given word length is determined. It may be necessary to weight the probabilities by the relative frequency of the word length if there is insufficient representation in the training set so as to remove the effect of mutations that are infrequent.

From this data, the regression line can be determined assuming that the basic shape of the function is:

$$Pr(x) = C_1 - C_2 \frac{1}{x^2}$$

where the Pr(x) is the probability of a mutation in a word length, and $C_1$ and $C_2$ are the parameter estimates of the regression. Each of the parameterized functions can be used to estimate the cost by position for each transformation.

The trained edit distance between two strings may be utilized in classifying the query transformation as relevant or not. The trained edit distance may be calculated using the differential costs according to a PAM scoring matrix from Equation 1.1, by using a position function based on query word lengths of Equation 1.2, or by using a combination of the two.

If a selected transition, has an undetermined relevance in the training set, such as if the transition is not adequately represented in the training set, the transition matrix may be populated with a normalized value for the selected transition. In determining the trained edit distance, the normalized value that is included in the transition matrix provides a neutral evaluation of the transition in comparison to other transitions which have either a positive or a negative impact on the relevance.

Turning to FIG. 1, in an implementation 100, a method is provided capable of increasing the relevance of database search results. A comparison of a search query 110 with candidates 120 is performed to determine the trained edit distance 130 between the search query 110 and the candidates of list 120. Trained costs, derived from a training set of labeled transformations 140, are utilized in the determination of the trained edit distance 130. In the example of FIG. 1, pairs of strings S1, S2 are evaluated and labeled as having relevant or non-relevant transformations. Directional costs 150 are obtained from the training set of labeled transformations 140 and used to create cost matrices 160.

As shown in FIG. 1, one or more of the cost matrices 160 may be multi-dimensional. Hence, the type of mutation in connection with its context, may be captured and accounted for. For example, one or more of the matrices 160 may include trained costs based on a position of a mutation in a string; trained costs of a mutation based on a size of a string; trained costs of a mutation considering at least one other mutation within a string including but not limited to adjacent and/or surrounding changes; trained costs of a mutation in view of at least one other character in a string; and/or trained costs of a mutation in view of character combinations within a string including but not limited to word-by-word, syllable-by-syllable, and/or combinations of words. A string may be one word or a group of words, or one or more sub-portions of a word or group of words.

In the example of FIG. 1, the cost factors from matrices 160 associated with the trained edit distance between a search query GUMBO and a candidate string GAMBOL are summed to provide the edit distance 130. Thus, the cost factor α from the substitution matrix 168 and the cost factor β from the insertions matrix 166 are summed to provide an edit distance of α+β. As the matrices 168 and 166 may be multi-dimensional, the cost factor α and/or the cost factor β may include costs in connection with the context of the mutation, as well as the type of mutation.

The trained edit distance 130 of each candidate 120a through 120n may be compared to a threshold value and/or to the other candidates to provide a best candidate for selection, or to provide a group of candidates for selection, depending on search parameters. The group of candidates may be selected from the same concept space, or from different concept spaces. This can facilitate further disambiguation of the search query 110.

The list of candidates 120 may be any list, group, set, or database for matching with a string. The string may be an entire "raw" query string, portions, sub-portions, or a derivation or augmentation of the "raw" search query. The list of candidates 120, for example, may be terms, words, phrases, or character combinations, such as but not limited to: a list of general dictionary terms; a subset of dictionary terms; a large text corpus; a set of common terms, words, phrases, or character combinations; a set of specialized terms, words, phrases, or character combinations; a list of terms, words, phrases, or character combinations from a paper, book, or group of works; a query log or other list of prior input terms, words, phrases, or character combinations; a list of pre-selected terms, words, phrases, or character combinations; or a commercial search database, such as for example a list of "bidded" terms or phrases as described in U.S. Pat. No. 6,269,361, issued on Jul. 31, 2001, by Davis et al., entitled SYSTEM AND METHOD FOR INFLUENCING A POSITION ON A SEARCH RESULT LIST GENERATED BY A COMPUTER NETWORK SEARCH ENGINE, herein incorporated by reference in its entirety.

In some implementations, if the candidate list is large and search speed is particularly important, an abbreviated candidate list may be provided from a large listing. The abbreviated list may include candidates within a uniform edit distance of the search query 110.

For example, the list of candidates 120 may include all mutations within zero to two edits away from the search query 110. The uniform edit distance may be selected based on string length of the search query 110, or other similar criteria, to control the number of the candidates in the list. The candidate list may be expanded if the trained edit distance evaluation does not produce a satisfactory match within the initially selected uniform edit distance.

The method illustrated in FIG. 1 may be utilized on query strings in general. As such, in some implementations the search query 110 may be a "raw" search query, or it may be a portion, a sub-portion, or a refinement of a search query. Furthermore, in some implementations, the trained edit distance may be utilized in the selection of a candidate string for use in augmenting and/or refining of a "raw" search query 110.

In some implementations, evaluation of the trained edit distance 130 may be utilized to identify an exact match candidate with a search query. Or, it may provide an approximate match candidate. Thus, in some implementations, evaluation of the trained edit distance may used to select a best match candidate or candidates, which may be an exact match, or an approximate match.

Figure 2:
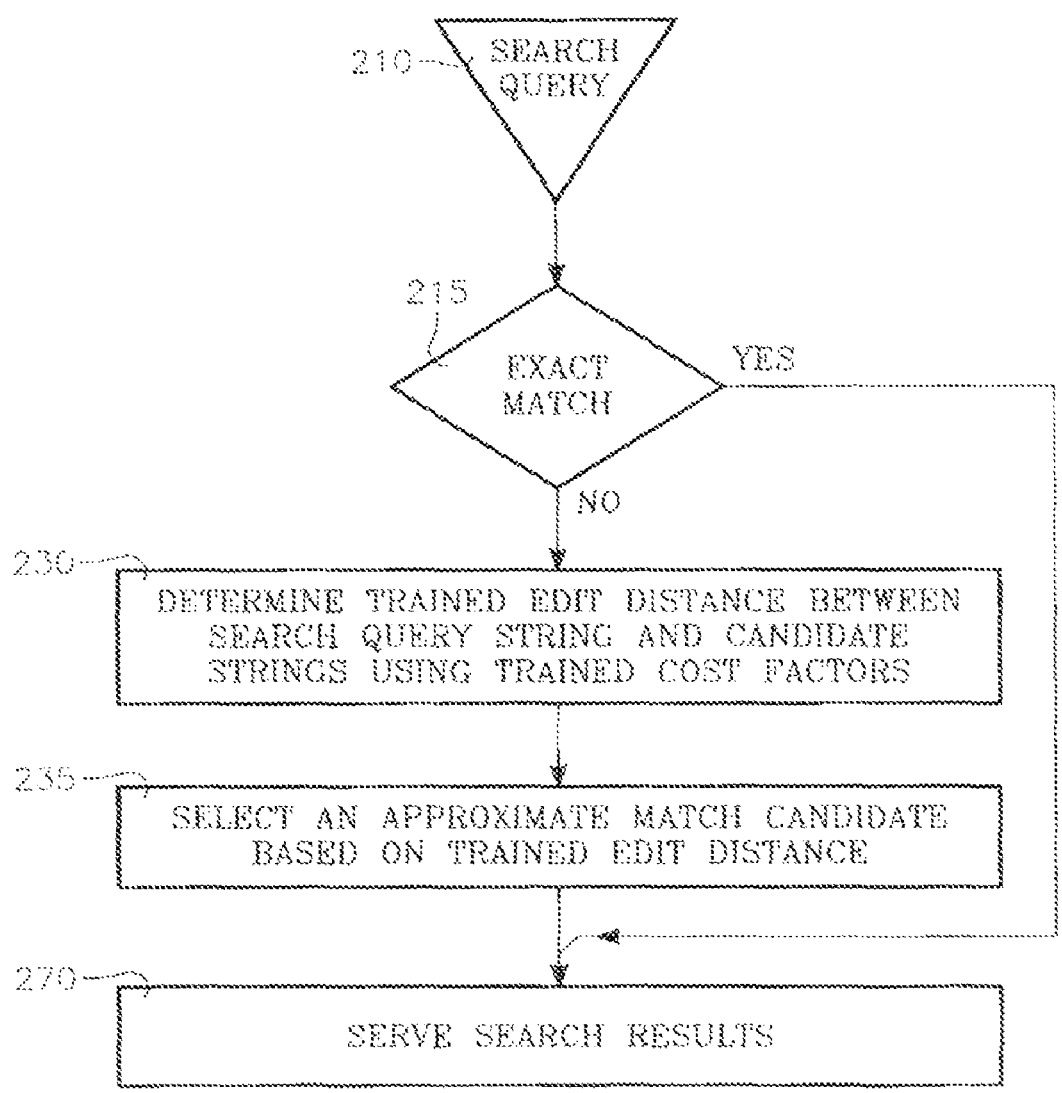
FIG. 2 shows a flow chart of a possible implementation in accordance with the present invention.

In other implementations, as illustrated in FIG. 2, a conventional search engine may be utilized to evaluate whether an exact match exists 215. If there is no exact match, the trained edit distance of the candidate strings are determined using the trained cost factors 230, and an approximate match candidate is selected based on the trained edit distance 235. Thereafter, a search result may be served 270.

As discussed above, one or more transition matrices may be used in evaluating the transformed query strings. For example, the transition matrices may include a substitution matrix, an insertion matrix, a deletion matrix, a transpositions matrix, a positional matrix, or the like, which optionally may include cost factors correlating the context of a mutation. Further, the transition matrix/matrices may be utilized in one or more different modules of a database accessing process to improve performance of a system.

Implementations discussed herein may be utilized an Internet based search engine, which is resident on a remote user computer, on a host computer, on an other networked device, or the like. Also, it is contemplated that they may be utilized in stand alone general or specific purpose computers or other devices capable of database or file searching.

Figure 3:
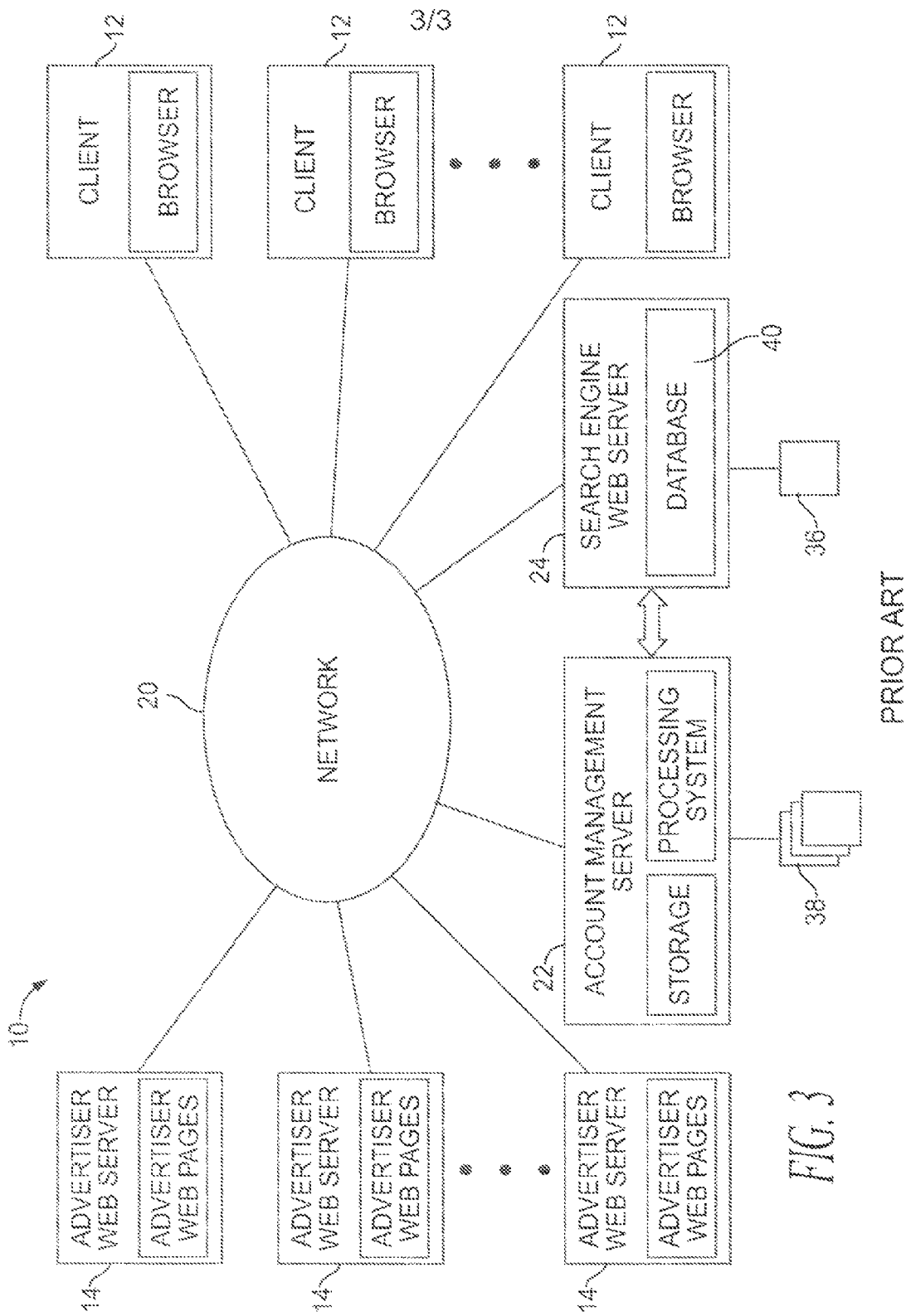
FIG. 3 shows a block diagram of a system in accordance with a possible embodiment of the present invention.

Turning to FIG. 3, disclosed in U.S. Pat. No. 6,269,361, is an example of a distributed Internet based system 10 configured in a client/server architecture. On such a system, a client 12 may perform a search of a search database 40 using a search engine web page 36. The search engine 24 and search database 40 may reside on a search engine web server 24. The search engine web page 36 may include a query box in which a searcher may type in a search term comprising one or more keywords. Alternatively, the searcher may query the search engine web server 24 through a query box hyperlinked to the search engine web server 24 and located on a web page stored at a remote web server. When the searcher has finished entering the search term, the searcher may transmit the query to the search engine web server 24 by clicking on a provided hyperlink. The search engine web server 24 will then generate a search result list page after processing and mapping the query to the search database 40, which may include, or be, "bidded" terms from advertisers. The search engine web server 24 will then transmit this result to the searcher at the client computer 12 via the network 20.

The transition matrix or matrices discussed above may be employed by any process flow or system involving mapping or matching of queries that are indefinite in the sense that they do not exactly match the spelling, punctuation, format, etc., of the terms in a term set. As such, by utilizing the trained edit distance obtained with transition matrices which have transformation cost factors derived from a training set, the capabilities of modules and sub-modules for database accessing can be expanded.

It is contemplated that there may be several ways to enhance this model to provide a more general classifier. One way is to ensure an adequate size for the training sample. This would have two effects on the efficacy of the model. The first is that, with a larger sample, the confidence about the mutabilities used to calculate cost can be better estimated. The second is that with a larger sample, it is more likely that the costs for more transitions are known. Another way to enhance to classifier would be to optimize the costs in the PAM matrix on the training sample using one of several optimizing techniques such as downhill simplex or genetic algorithms. With such optimization, however, the number of dimensions is equal to size of the cost matrix. If this makes normal optimization intractable, principle component analysis or PCA could be used to first reduce the dimensionality of the cost matrix before optimization.

The foregoing description has been presented for the purposes of illustration and description. It is not intended to be exhaustive or to limit the invention to the precise form or method disclosed. The above description is not limited to the specific implementations, embodiments, and examples discussed above. Aspects of some implementations, embodiments, or examples may be combined with other implementations, embodiments, or examples. Further, not all aspects of the implementations, embodiments, or examples are required in every implementations, embodiments, or example. Many modifications and variations are possible in light of the above teaching. It is intended that the scope of the invention be limited not by this description, but rather by the claims appended hereto.

What is claimed is:

1. A computerized method for increasing relevance of database search results, the method comprising:
   electronically receiving, via a computing device, a subject query string, the subject query string capable of including a plurality of words;
   determining, via the computing device, a trained edit distance between the subject query string and at least one candidate string using trained cost factors derived from a training set of labeled query transformations, including using a multi-dimensional cost matrix;
   evaluating, via the computing device, the at least one candidate string for selection based on the trained edit distance; and
   providing a list of candidate string, wherein determining the trained edit distance includes using the list of candidate strings.

2. The method of claim 1 wherein determining the trained edit distance comprises using at least one of: (a) a substitutions matrix, (b) an insertions matrix, (c) a deletions matrix, or (d) a transpositions matrix.

3. The method of claim 2 wherein determining the trained edit distance comprises using trained cost factors associated with a context of a mutation.

4. The method of claim 3 wherein determining the trained edit distance comprises using trained cost factors including at least one of: (a) trained costs based on a position of a mutation in a string, (b) trained costs of a mutation based on a size of a string, (c) trained costs of a mutation considering at least one other mutation within a string, (d) trained costs of a mutation in view of a character in a string, or (e) trained costs of a mutation in view of character combinations within a string.

5. The method of claim 1 wherein determining the trained edit distance comprises using trained cost factors associated with a context of a mutation.

6. The method of claim 5 wherein determining the trained edit distance further comprises using trained cost factors including at least one of: (a) trained costs based on a position of a mutation in a string, (b) trained costs of a mutation based on a size of a string, (c) trained costs of a mutation considering at least one other mutation within a string, (d) trained costs of a mutation in view of a character in a string, or (e) trained costs of a mutation in view of character combinations within a string.

7. The method of claim 1 further comprising:
   selecting at least one candidate string corresponding to the subject query string based on the trained edit distance.

8. The method of claim 1 further comprising:
   providing an abbreviated list of candidate strings from a group of candidate strings; and
   determining the trained edit distance includes using the abbreviated list of candidate strings.

9. The method of claim 8 wherein providing the abbreviated list of candidate strings comprises providing candidate strings within a uniform edit distance of the subject query string.

10. The method of claim 1 further comprising:
    searching for an exact match for the subject query string prior to determining the trained edit distance; and
    determining the trained edit distance if an exact match for the subject query string is not found.

11. A system for increasing relevance of database search results, the system comprising:

computer readable medium having executable instructions stored therein; and a processing device, in response to the executable instructions, operative to:

receive a subject query string, the subject query string capable of including a plurality of words;

determine a trained edit distance between the subject query string and at least one candidate string using trained cost factors derived from a training set of labeled query transformations, including using a multi-dimensional cost matrix;

evaluate the at least one candidate string for selection based on the trained edit distance; and provide a list of candidate string, wherein determining the trained edit distance includes using the list of candidate strings.

12. The system of claim 11 wherein determining the trained edit distance comprises using at least one of: (a) a substitutions matrix, (b) an insertions matrix, (c) a deletions matrix, or (d) a transpositions matrix.

13. The system of claim 12 wherein determining the trained edit distance comprises using trained cost factors associated with a context of a mutation.

14. The system of claim 13 wherein determining the trained edit distance comprises using trained cost factors including at least one of: (a) trained costs based on a position of a mutation in a string, (b) trained costs of a mutation based on a size of a string, (c) trained costs of a mutation considering at least one other mutation within a string, (d) trained costs of a mutation in view of a character in a string, or (e) trained costs of a mutation in view of character combinations within a string.

15. The system of claim 11 wherein determining the trained edit distance comprises using trained cost factors associated with a context of a mutation.

16. The system of claim 15 wherein determining the trained edit distance further comprises using trained cost factors including at least one of: (a) trained costs based on a position of a mutation in a string, (b) trained costs of a mutation based on a size of a string, (c) trained costs of a mutation considering at least one other mutation within a string, (d) trained costs of a mutation in view of a character in a string, or (e) trained costs of a mutation in view of character combinations within a string.

17. The system of claim 11, the processing device further operative to select at least one candidate string corresponding to the subject query string based on the trained edit distance.

18. The system of claim 11, the processing device further operative to:

provide an abbreviated list of candidate strings from a group of candidate strings; and determine the trained edit distance comprises using the abbreviated list of candidate strings.

19. The system of claim 18 wherein providing the abbreviated list of candidate strings comprises providing candidate strings within a uniform edit distance of the subject query string.

20. The system of claim 11, the processing device further operative to:

search for an exact match for the subject query string prior to determining the trained edit distance; and determine the trained edit distance if an exact match for the subject query string is not found.

* * * * *